(12) United States Patent
Suzuki et al.

(10) Patent No.: US 6,451,238 B1
(45) Date of Patent: Sep. 17, 2002

(54) PROCESS FOR PRODUCING INTAKE MEMBER OF RESIN, AND INTAKE MEMBER OF RESIN

(75) Inventors: Kenichi Suzuki; Tamio Furuya; Yoshi Yamane, all of Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/286,440

(22) Filed: Apr. 6, 1999

(30) Foreign Application Priority Data

Apr. 7, 1998 (JP) .......................................... 10-094160
Dec. 1, 1998 (JP) .......................................... 10-341943

(51) Int. Cl.[7] .............................................. B29C 45/16
(52) U.S. Cl. ...................... 264/250; 264/259; 264/266; 264/271.1; 264/279; 264/327; 264/328.8; 264/328.14; 264/328.16
(58) Field of Search ................................ 264/250, 259, 264/266, 271.1, 279, 327, 328.8, 328.14, 328.16

(56) References Cited

U.S. PATENT DOCUMENTS 3,233,861 A * 2/1966 Stillwagon .................. 251/148
3,882,220 A * 5/1975 Ryder ......................... 264/221
4,740,347 A * 4/1988 Sloan, Jr. et al. ........... 264/262
5,177,866 A * 1/1993 Bennett et al. ......... 29/890.127
5,421,718 A * 6/1995 Karlsson et al. ............ 425/577
5,615,861 A * 4/1997 Pollman et al. ............. 251/306
5,794,591 A * 8/1998 Kalebjian et al. ........... 123/337

FOREIGN PATENT DOCUMENTS

DE      43 34 180       4/1995
DE      44 80 109       6/1995
JP      62-196115       8/1987

OTHER PUBLICATIONS

WPI Abstract Accession No. 89–295421/41 & JP 1216067, Aug. 30, 1989.

* cited by examiner

Primary Examiner—Suzanne E. McDowell
(74) Attorney, Agent, or Firm—Arent Fox Kintner Plotkin & Kahn, PLLC

(57) ABSTRACT

A process produces a resin intake member by injection moling. The intake member has a hollow generally cylindrical main section and a subsidiary section integrally connected to an outer periphery of the hollow main section. The process includes a primary molding step which forms the hollow main section in a primary molding die and a secondary molding step which subsequently inserts the formed hollow main section into a secondary molding die to integrally form the subsidiary section with the hollow main section in the secondary molding die.

8 Claims, 12 Drawing Sheets

FIG.6 SECONDARY MOLDING STEP

FIG.7 SECONDARY MOLDING STEP

FIG.9
SECONDARY MOLDING STEP

PROCESS FOR PRODUCING INTAKE MEMBER OF RESIN, AND INTAKE MEMBER OF RESIN

BACKGROUND OF THE INVENTION

1. FIELD OF THE INVENTION

The present invention relates to an intake member of a resin including a generally cylindrical main section of a resin, and a subsidiary section of a resin which is integrally connected to an outer periphery of the main section, and a process for producing the same.

2. DESCRIPTION OF THE RELATED ART

A process for forming a mixture body block of a carburetor which is an intake member for an engine, using a resin by injection molding, has been proposed in Japanese Patent Application Laid-open No. 62-196115.

A member such as the mixture body block requires less accuracy in dimension and hence, could be formed from a resin which is generally not so accurate in dimension, as compared with a metal. A member such as a throttle body which is an intake member for an engine, however, requires a sufficiently high dimensional accuracy at its inner peripheral surface, because a clearance between the inner peripheral surface of such member and an outer peripheral surface of a throttle valve accommodated in the throttle body and turned therein exerts a large influence to the idling performance of the engine.

SUMMARY OF THE INVENTION

Accordingly, it is an object of the present invention to provide a process for forming an intake member for an engine that requires a high accuracy in dimension, from a resin by molding, and an intake member of a resin produced in such process. To achieve the above object, according to a first aspect and feature of the present invention, there is provided a process for producing an intake member of a resin by injection molding, in which the intake member includes a generally cylindrical main section of a resin, and a subsidiary section of a resin integrally connected to an outer periphery of the main section, wherein the process comprises a primary molding step of forming the main section in a primary molding die, and a secondary molding step of subsequently inserting the formed main section into a secondary molding die to form the subsidiary section integrally with the main section in the secondary molding die.

With the above feature, the main section formed at the primary molding step is generally cylindrical and has no large difference in thickness among its respective portions. Therefore, the shrinkage and warping generated during cooling can be suppressed to the minimum, thereby enabling the main section to be provided with a higher roundness or circularity. Moreover, the subsidiary section integrally connected to an outer periphery of the cylindrical main section is formed by the secondary molding step subsequent to the primary molding step and therefore, an intake member of resin having a desired shape can be finally produced.

According to a second aspect and feature of the present invention, in addition to the first feature, at the primary molding step, a molten resin is supplied through a disk gate to axially one end of a cavity of the primary molding die.

With the above feature, by supplying the molten resin through the disk gate to axially one end of the cavity in the primary molding die at the primary molding step, the resin can be poured uniformly into the cavity to prevent the orientation of a filler contained in the resin, thereby producing an intake member of a resin having a higher accuracy.

According to a third aspect and feature of the present invention, in addition to the first or second feature, the die temperature at an inner peripheral surface of the main section is set lower than the die temperature at an outer peripheral surface of the main section at the primary molding step.

With the above feature, the die temperature at the inner peripheral surface of the main section is set lower than die the temperature at the outer peripheral surface of the main section. Therefore, the inner peripheral surface of the main section can be cooled in advance to prevent the generation of shrinkage and warping, leading to a further increased roundness of the inner peripheral surface.

According to a fourth aspect and feature of the present invention, in addition to the first or second feature, the intake member of resin is a throttle body having a throttle valve turnably supported therein.

With the above feature, since the intake member of the resin is the throttle body, the roundness of the throttle body can be increased, whereby the clearance between the inner peripheral surface of the throttle body and an outer periphery of the throttle valve can be uniformized, leading to an enhanced idling performance of an engine.

According to a fifth aspect and feature of the present invention, in addition to the fourth feature, a pair of boss portions for supporting a stem portion of the throttle valve is integrally formed on the main section at the primary molding step.

With the above feature, when the main section is formed, the pair of boss portions for supporting the stem portion of the throttle valve is formed on the main section. Therefore, not only the accuracy of the boss portions can be enhanced, but also the number of forming the boss portions can be suppressed to the minimum.

According to a sixth aspect and feature of the present invention, in addition to the first feature, different types of resin materials are used for forming the main section and the subsidiary section.

With the above feature, the freedom degree of selecting the material according to the demand for a dimensional accuracy and the demand for a reduction in cost is increased.

According to a seventh aspect and feature of the present invention, in addition to the first feature, the intake member is integrally formed by injection-molding a super engineering plastic as a resin material in a cavity of the primary molding die and injection-molding a general-purpose engineering plastic as a resin material in a cavity of the secondary molding die.

With the above feature, the demands for a dimensional accuracy and a reduction in cost can be reconciled by injection-molding the super engineering plastic or the general-purpose engineering plastic depending on each portion in the intake member.

According to an eighth aspect and feature of the present invention, there is provided a process for producing an intake member of a resin by injection molding, in which the intake member includes a generally cylindrical main section, and a subsidiary section integrally connected to an outer periphery of the main section, wherein the process comprises a primary molding step of forming the main section in a primary molding die, and a secondary molding step of subsequently inserting the formed main section into a secondary molding die to form the subsidiary section integrally with the main section in the secondary molding die, wherein the same type of a resin material is used for forming the main section and the subsidiary section.

With the above feature, the main section formed at the primary molding step is generally cylindrical and has no large difference in thickness among its respective portions. Therefore, the shrinkage and warping generated during cooling can be suppressed to the minimum, thereby enabling the main section to be provided with a higher roundness or circularity. Moreover, the subsidiary section integrally connected to an outer periphery of the cylindrical main section is formed at the secondary molding step subsequent to the primary molding step and therefore, an intake member of resin having a desired shape can be finally produced. In addition, the same type of resin material is used for forming the main section formed at the primary molding step and the subsidiary section formed at the secondary molding step. Therefore the main section and the subsidiary section can be easily integrally formed in a satisfactorily conformed fashion, leading to a further increased roundness of the main section. Moreover, one type of resin material may be injected and hence, an injection molding apparatus can be simplified to reduce the equipment cost.

According to a ninth aspect and feature of the present invention, in addition to the eighth feature, the resin material is a super engineering plastic or a general-purpose engineering plastic.

With the above feature, the performance and the cost can be freely selected depending on the degree of priority by properly using the super engineering plastic which provides an enhanced dimensional accuracy in a product, but is expensive, or the general-purpose engineering plastic which provides a slightly lower dimensional accuracy in a product but is inexpensive.

According to a tenth aspect and feature of the present invention, there is provided an intake member of a resin including a generally cylindrical main section of a resin, and a subsidiary section of a resin integrally connected to an outer periphery of the main section, wherein the main section is formed in a primary molding die at a primary molding step, and subsequently the formed main section is inserted into a secondary molding die in which the subsidiary section is formed integrally with the main section at a secondary molding step.

With the above feature, the main section primarily formed is generally cylindrical and has no large difference in thickness among its respective portions. Therefore, the shrinkage and warping generated during cooling can be suppressed to the minimum, thereby enabling the main section to be provided with a higher roundness or circularity. Moreover, the subsidiary section integrally connected to an outer periphery of the cylindrical main section is formed at the secondary molding step subsequent to the primary molding step and therefore, an intake member of resin having a desired shape can be finally produced.

According to an eleventh aspect and feature of the present invention, in addition to the tenth feature, at the primary molding step, a molten resin is supplied through a disk gate to axially one end of a cavity of the primary molding die.

With the above feature, by supplying the molten resin through the disk gate to axially one end of the cavity of the primary molding die at the primary molding step, the resin can be poured uniformly into the cavity to prevent the orientation of a filler contained in the resin, thereby producing an intake member of resin having a higher accuracy.

According to a twelfth aspect and feature of the present invention, in addition to the tenth or eleventh feature, the die temperature at an inner peripheral surface of the main section is set lower than the die temperature at an outer peripheral surface of the main section at the primary molding step.

With the above feature, the temperature of the die at the inner peripheral surface of the main section is set lower than the temperature of the die at the outer peripheral surface of the main section. Therefore, the inner peripheral surface of the main section can be cooled in advance to prevent the generation of shrinkage, leading to a further increased roundness of the inner peripheral surface.

According to a thirteenth aspect and feature of the present invention, in addition to the tenth or eleventh feature, the intake member of resin is a throttle body having a throttle valve turnably supported therein.

With the above feature, since the intake member of resin is the throttle body, the roundness of the inner peripheral surface of the throttle body can be enhanced, whereby the clearance between the inner peripheral surface of the throttle body and an outer periphery of the throttle valve can be uniformized, leading to an enhanced idling performance of an engine.

According to a fourteenth aspect and feature of the present invention, in addition to the thirteenth feature, a pair of boss portions for supporting a stem portion of the throttle valve is integrally formed on the main section at the primary molding step.

With the above feature, when the main section is formed, the pair of boss portions for supporting the stem portion of the throttle valve is formed on the main section. Therefore, not only the accuracy of the boss portions can be enhanced, but also the number of steps for forming the boss portions can be suppressed to the minimum.

According to a fifteenth aspect and feature of the present invention, in addition to the tenth feature, different types of resin materials are used for forming the main section and the subsidiary section.

With the above feature, the freedom degree of selecting the resin material according to the demand for a dimensional accuracy and the demand for a reduction in cost is increased.

According to a sixteenth aspect and feature of the present invention, in addition to the tenth feature, the intake member is integrally formed by injection-molding a super engineering plastic as a resin material in a cavity of the primary molding die and injection-molding a general-purpose engineering plastic as a resin material in a cavity of the secondary molding die.

With the above feature, the demands for a dimensional accuracy and a reduction in cost can be reconciled by injection-molding the super engineering plastic or the general-purpose engineering plastic depending on each portion in the intake member.

According to a seventeenth aspect and feature of the present invention, there is provided an intake member of a resin including a generally cylindrical main section of a resin, and a subsidiary section of a resin integrally connected to an outer periphery of the main section, wherein the main section is formed in a primary molding die at a primary molding step, subsequently, the formed main section is inserted into a secondary molding die, in which the subsidiary section is formed integrally with the main section at a secondary molding step, wherein the same type of a resin material is used for forming the main section and the subsidiary section.

With the above feature, the main section primarily formed is generally cylindrical and has no large difference in thickness among its respective portions. Therefore, the shrinkage and warping generated during cooling can be suppressed to the minimum, thereby enabling the main section to be provided with a higher roundness or circularity. Moreover, the subsidiary section integrally connected to an outer periphery of the cylindrical main section is formed by the secondary molding step subsequent to the primary molding step and therefore, an intake member of resin having a desired shape can be finally produced. In addition, the same type of resin material is used for forming the main section formed at the primary molding step and the subsidiary section formed at the secondary molding step. Therefore, the main section and the subsidiary section can be easily integrally formed in a satisfactorily conformed fashion, leading to a further increased roundness of the main section. Moreover, one type of resin material may be injected and hence, an injection molding apparatus can be simplified to reduce the equipment cost.

According to an eighteenth aspect and feature of the present invention, in addition to the seventeenth feature, the resin material is a super engineering plastic or a general-purpose engineering plastic.

With the above feature, the performance and the cost can be freely selected depending on the degree of priority by properly using the super engineering plastic which provides an enhanced dimensional accuracy of a product, but is expensive, or the general-purpose engineering plastic which provides a slightly lower dimensional accuracy of a product but is inexpensive.

The above and other objects, features and advantages of the invention will become apparent from the following description of the preferred embodiment taken in conjunction with the accompanying drawings.

BRIEF DESCRIPTION OF THE DRAWINGS

FIGS. 1A to 10 show a first embodiment of the present invention, wherein

DETAILED DESCRIPTION OF THE PREFERRED EMBODIMENTS

A first embodiment of the present invention will now be described with reference to FIGS. 1A to 10.

First, the structure of a throttle body 1 as an intake member of a resin produced by a process of the present invention will be described with reference to FIGS. 1A to 1C. As shown in FIG. 1C, the throttle body 1 is comprised of an inner main section 2, a subsidiary section 3 integrally formed on an outer periphery of the main section 2, and an icing-preventing pipe 4 of copper, which is supported on the outer periphery and embedded in the subsidiary section 3.

Figure 1A:
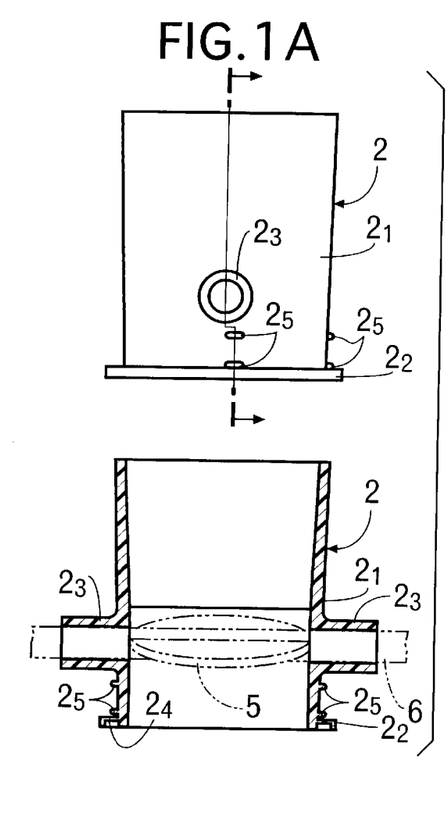
FIGS. 1A to 1C are views showing shapes of a throttle body at respective steps.

As shown in FIG. 1A, the main section 2 made of the resin includes a cylindrical portion $2_1$ formed into a cylindrical shape having a small taper, a flange portion $2_2$ integrally formed at axially one end of the cylindrical portion $2_1$ and coupled to an engine body, and a pair of boss portions $2_3, 2_3$ integrally provided on an outer peripheral surface of the cylindrical portion $2_1$ to protrude therefrom. An annular groove $2_4$ is defined in the flange portion $2_2$, so that an O-ring is fitted into the groove $2_4$, and a plurality of locking projections $2_5$ are formed on the outer peripheral surface of the cylindrical portion $2_1$. A circular throttle valve 5 accommodated in the cylindrical portion $2_1$ is supported at its stem 6 on the boss portions $2_3, 2_3$ and driven in opening and closing movement by a throttle actuator which is not shown. The main portion 2 is formed in an injection molding manner at a primary molding step by a primary molding die. At least the cylindrical portion $2_1$ in the vicinity of the throttle valve 5 is formed into a straight shape having no taper.

Figure 1B:
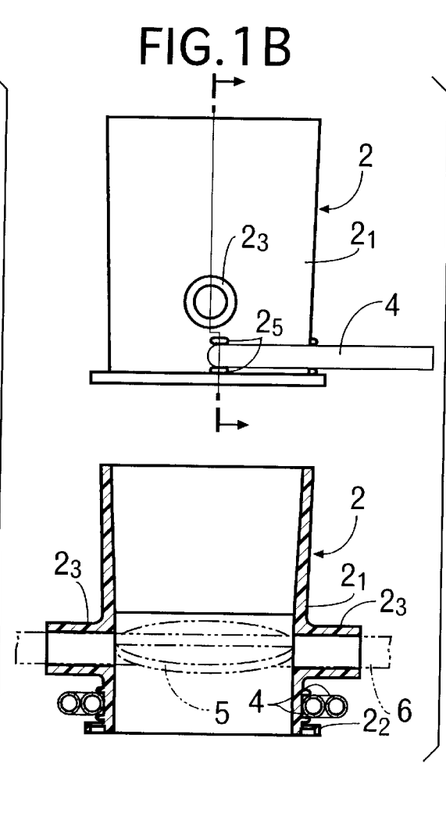
Figure 1C:
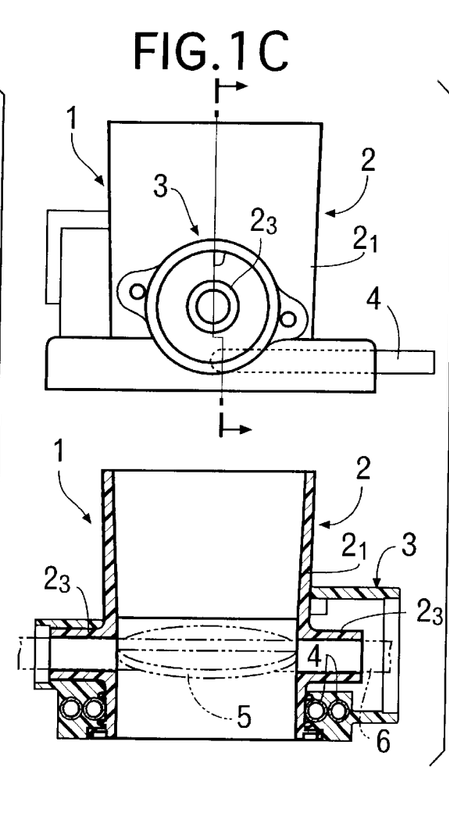

As shown in FIG. 1B, the pipe 4 is temporarily supported, at a pipe setting step subsequent to the primary molding step, on the plurality of locking projections $2_5$ provided on the cylindrical portion $2_1$ of the main section 2 to protrude therefrom.

As shown in FIG. 1C, the subsidiary section 3 of the resin is formed in an injection molding manner at a secondary molding step subsequent to the pipe setting step by a secondary molding die. The subsidiary section 3 is integrally provided with an air passage portion, a reinforced portion, a cord supporting portion, a portion attached to the main section and the like, in addition to a pipe-embedded portion in which the pipe 4 is embedded. The subsidiary section 3 is integrally formed to cover the outer periphery of the main section 2.

The structure of a throttle body molding die will be described below with reference to FIGS. 2 to 9.

The throttle body molding die includes a stationary plate 11, and a movable plate 12 which is movable in a direction of an arrow A–A' relative to the stationary plate 11 by a drive source which is not shown. A pair of upper and lower slide guides 13 and 14 are fixed to the movable plate 12, and a slider 15 is slidably carried between both the slide guides 13 and 14.

Figure 2:
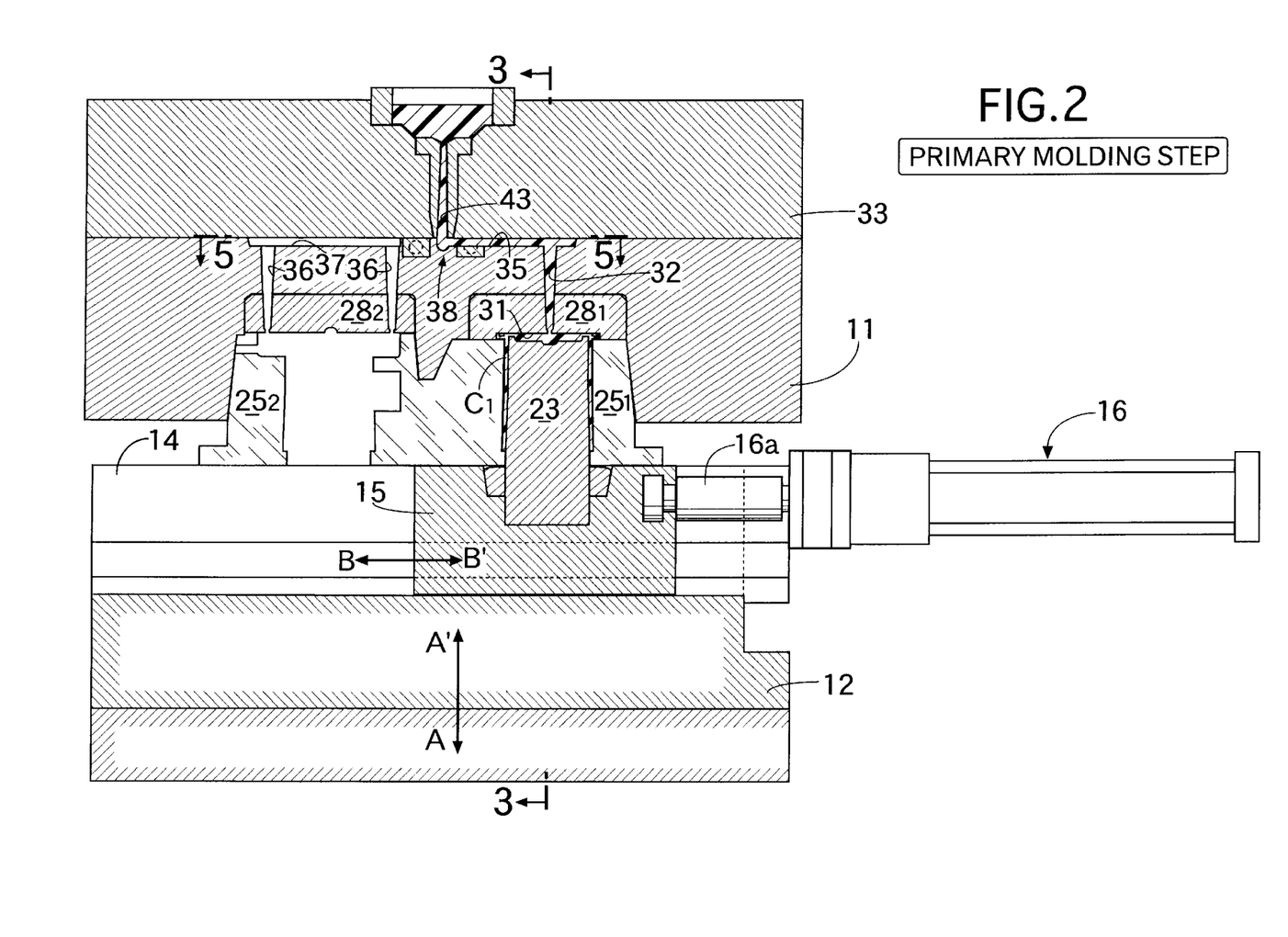
FIG. 2 is a horizontal sectional view (a sectional view taken along a line 2—2 in FIG.3) of a throttle body forming mold at a primary molding step.
Figure 6:
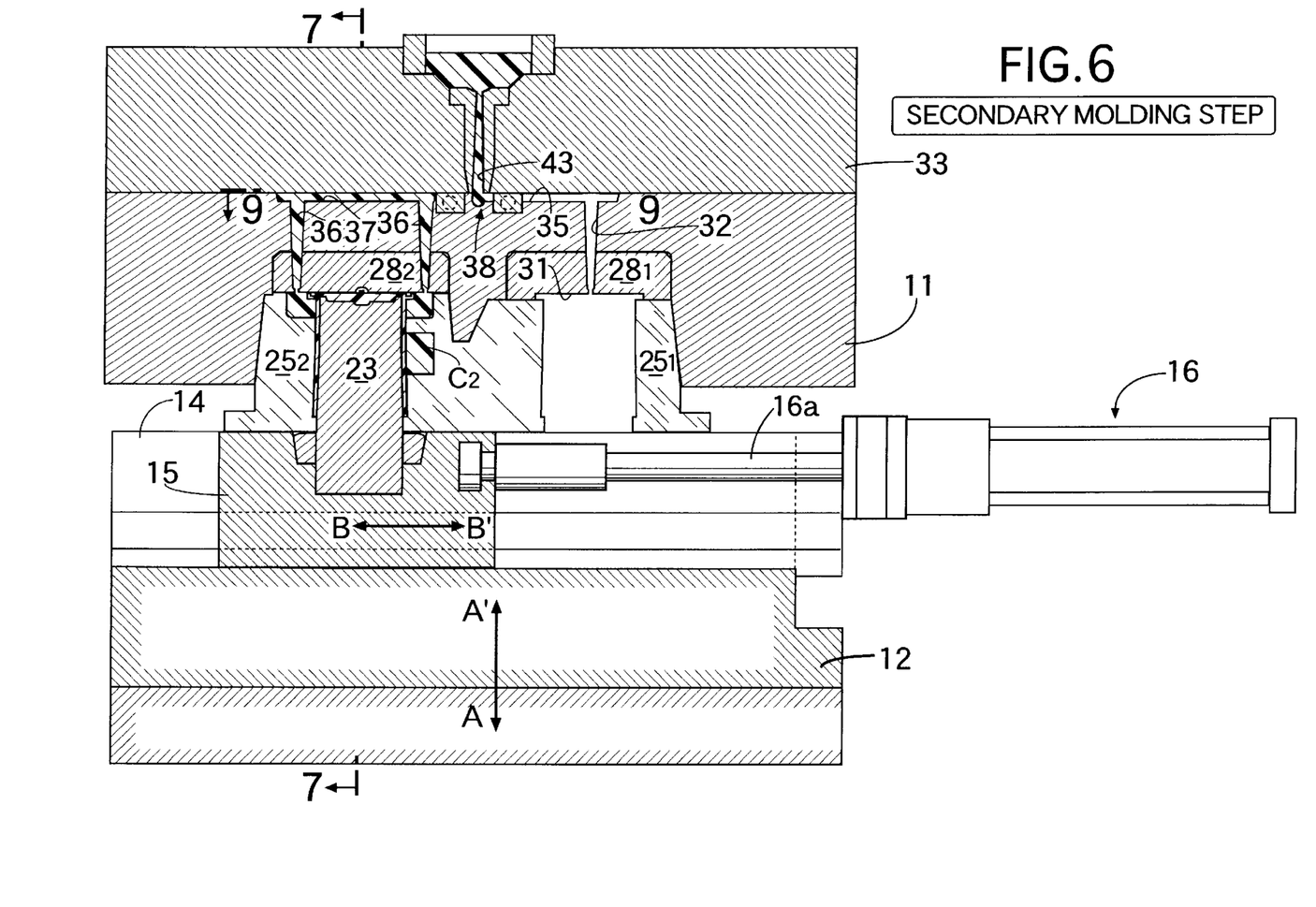
FIG. 6 is a horizontal sectional view (a sectional view taken along a line 6—6 in FIG. 7) of the throttle body forming mold at a secondary molding step.

The slider 15 is connected to an output rod 16a of a cylinder 16 fixed to the movable plate 12 and is slidable in a direction of an arrow B–B' in FIG. 2. As shown in FIG. 2, when the cylinder 16 is contracted, the slider 15 is stopped in a primary molding position, and as shown in FIG. 6, when the cylinder 16 is expanded, the slider 15 is stopped in a secondary molding position.

A generally columnar movable core 23 protruding toward the stationary plate 11 is fixed to the slider 15. A primary molding upper slide core $24_1$ and a secondary molding upper slide core $24_2$ are vertically slidably carried on a guide rail $12a$ which is vertically mounted at an upper portion of the movable plate 12, and a primary molding lower slide core $25_1$ and a secondary molding lower slide core $25_2$ are vertically slidably carried on a guide rail $12b$ which is vertically mounted at a lower portion of the movable plate 12.

Therefore, the primary molding upper slide core $24_1$ and the secondary molding upper slide core $24_2$ are lifted and lowered simultaneously with each other, and likewise, the primary molding lower slide core $25_1$ and the secondary molding lower slide core $25_2$ are lifted and lowered simultaneously with each other. The primary molding upper slide core $24_1$ is provided with a core pin $26_1$, and the primary molding lower slide core $25_1$ is provided with a core pin $27_1$. In addition, the secondary molding upper slide core $24_2$ is provided with a core pin $26_2$, and the secondary molding lower slide core $25_2$ is provided with a core pin $27_2$.

A primary molding stationary core $28_1$ and a secondary molding stationary core $28_2$ are provided in the stationary plate 11 in positions where they are opposed to the movable core 23 which is located in the primary molding position or the secondary molding position. Four inclined pins $29_1$, $29_2$, $30_1$ and $30_2$ are fixed to the stationary plate 11, so that the distance between tip ends of each pair of them are vertically increased toward the movable plate 12. Two of these inclined pins 29, and $30_1$ are slidably provided to extend through the primary molding upper slide core $24_1$ and the primary molding lower slide core $25_1$, and the remaining two inclined pins $29_2$ and $30_2$ are slidably provided to extend through the secondary molding upper slide core $24_2$ and the secondary molding lower slide core $25_2$. Four recesses $12c$, $12d$, $12e$ and $12f$ are defined in the movable plate 12 in order to avoid the interference of the movable plate 12 with tip ends of the inclined pins $29_1$, $29_2$, $30_1$ and $30_2$ during clamping of the mold.

Figure 3:
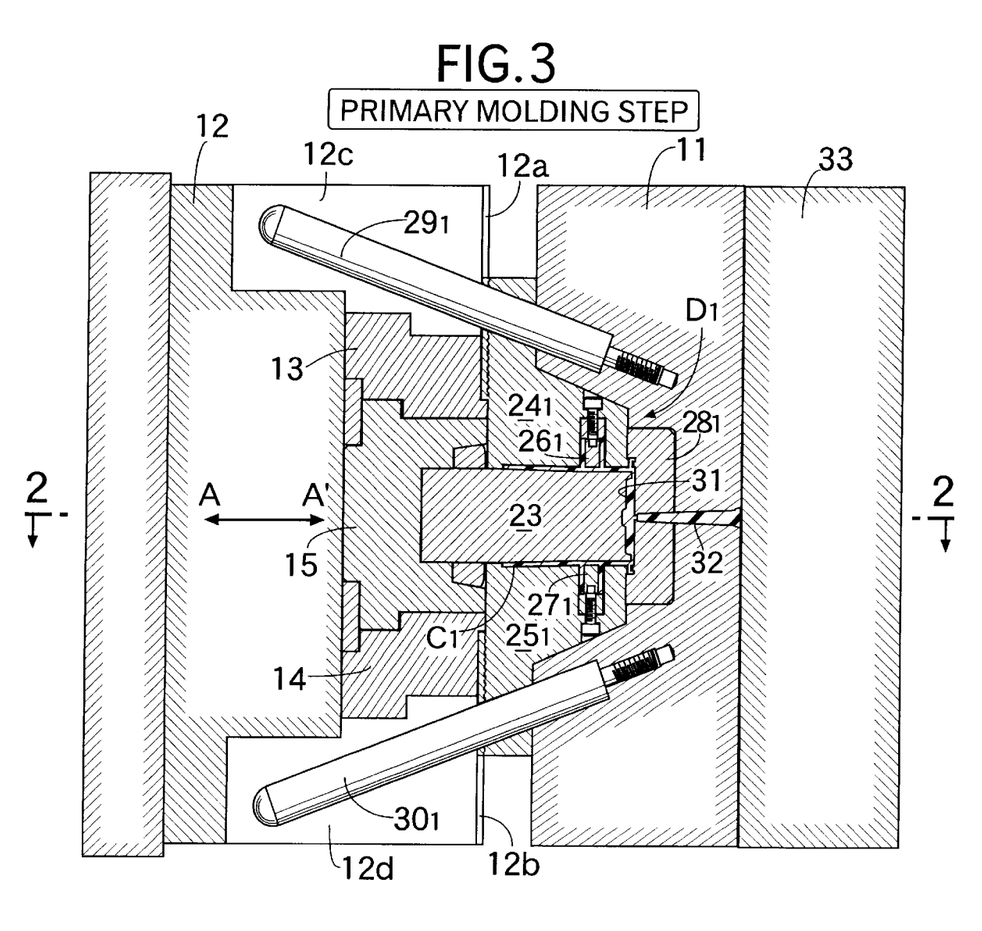
FIG. 3 is a sectional view taken along a line 3—3 in FIG. 2.
Figure 4:
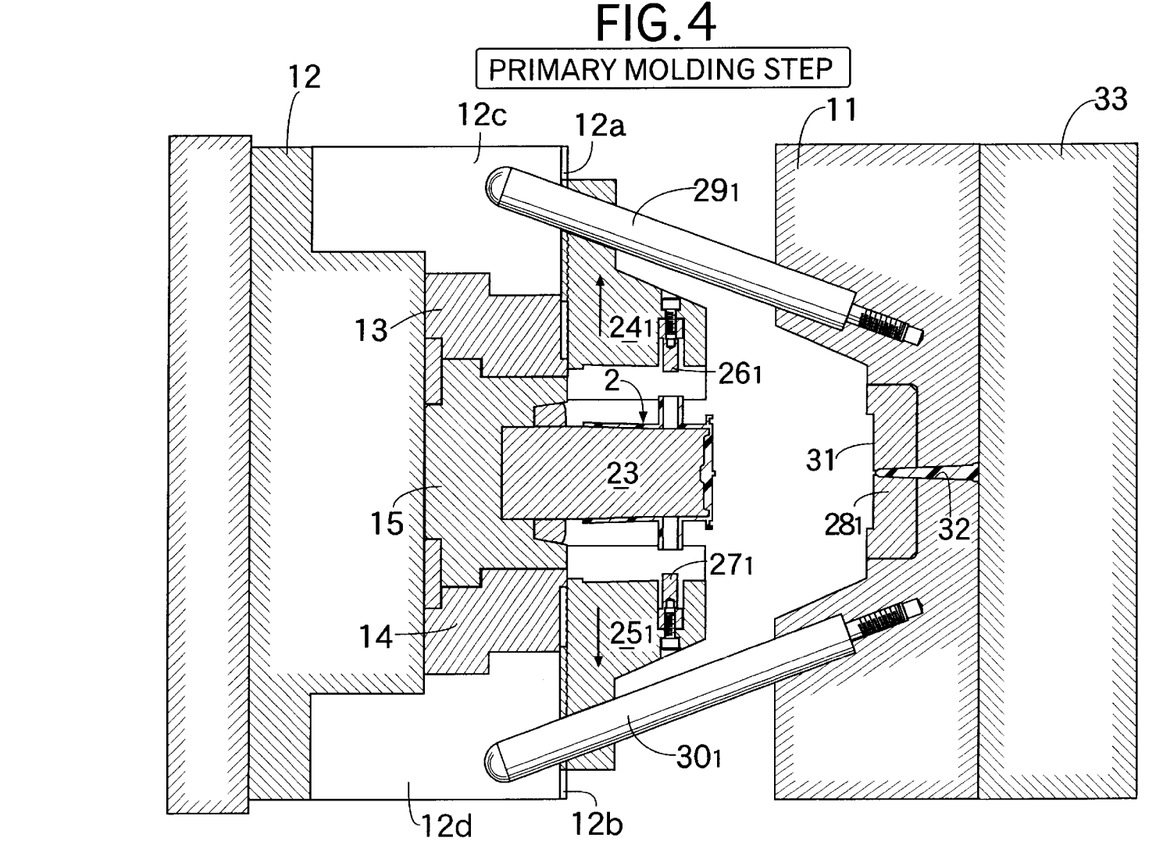
FIG. 4 is a view similar to FIG. 3, but for explaining the operation.

Thus, when the movable core 23 is located in the primary molding position shown in FIGS. 2 and 3, a primary molding cavity $C_1$ for forming the main section 2 of the throttle body 1 is defined by a primary molding die $D_1$ comprising the movable core 23, the primary molding upper slide core $24_1$, the primary molding lower slide core $25_1$ and the primary molding stationary core $28_1$. When the movable core 23 is located in the secondary molding position shown in FIGS. 6 and 7, a secondary molding cavity $C_2$ for forming the subsidiary section 3 of the throttle body 1 is defined by a secondary molding die $D_2$ comprising the movable core 23, the secondary molding upper slide core $24_2$, the secondary molding lower slide core $25_2$ and the secondary molding stationary core $28_2$.

A disk gate 31 is defined between opposed surfaces of the movable core 23 and the primary molding stationary core $28_1$, and connected to the entire area of one end of the primary molding cavity, and a runner 32 extending through the stationary plate 11 and the primary molding stationary core 28, is connected to the center of the disk gate 31. A runner plate 33 is superposed on a back of the stationary plate 11 for movement away from and toward the stationary plate 11, and a runner 35 connected to the runner 32 is defined in the stationary plate 11 opposed to the runner plate 33. Two runners 36, 36 connected to one end of the secondary molding cavity $C_2$ extend through the stationary plate 11 and the primary molding stationary core $28_1$. A runner 37 connected to the runners 36, 36 is defined to the stationary plate 11 opposed to the runner plate 33.

Figure 5:
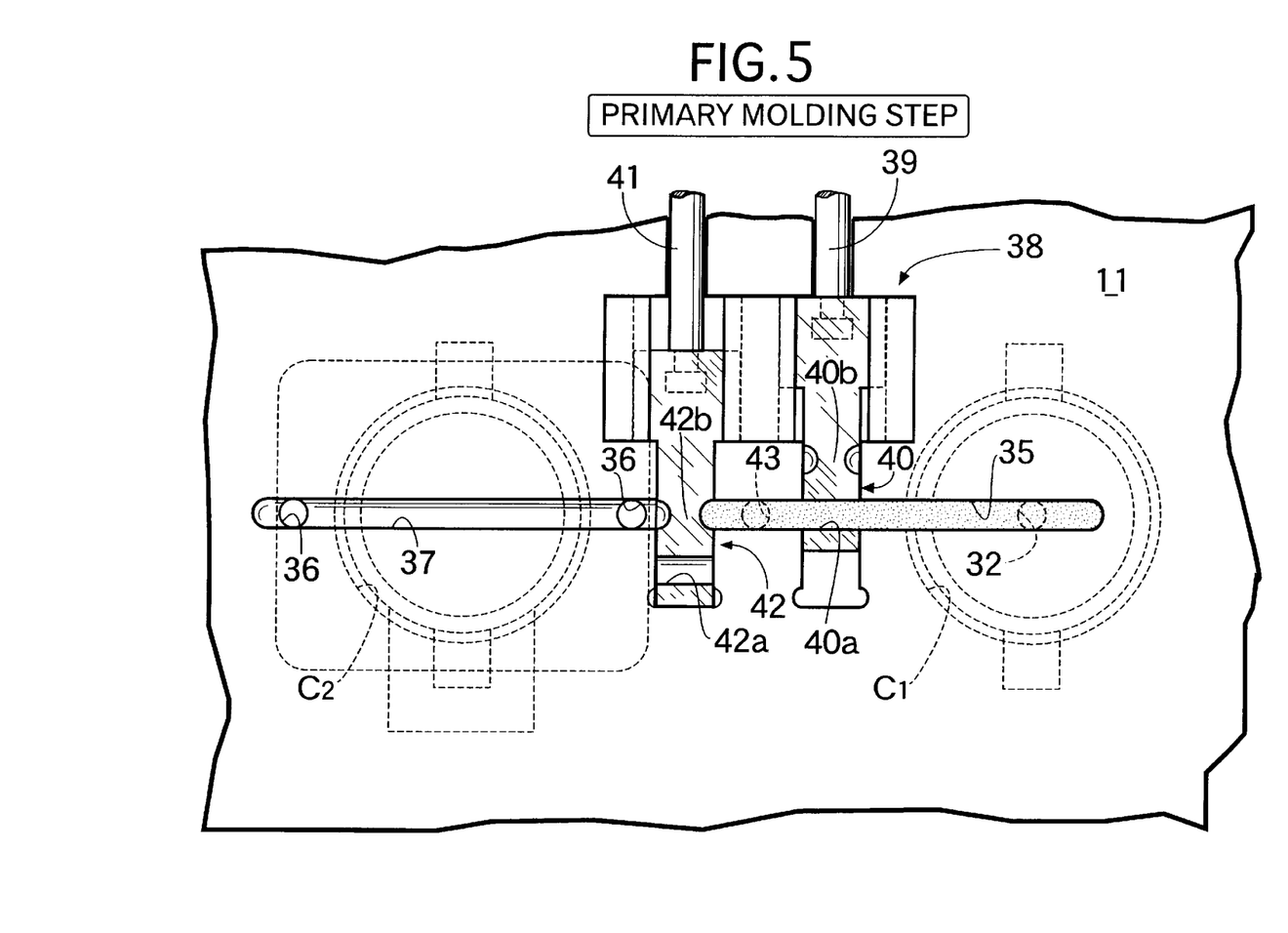
FIG. 5 is an enlarged view taken along a line 5—5 in FIG. 2.

As shown in FIGS. 5 and 6, a switch-over valve 38 for distributing a molten resin into the primary molding cavity $C_1$ and the secondary molding cavity $C_2$ is provided at a portion of the stationary plate 11 which is opposed to the runner plate 33. The switch-over valve 38 includes a first spool 40 slidable by a rod 39, and a second spool 42 slidable by a rod 41. The first and second spools 40 and 42 are driven in opposite directions by a drive source which is not shown.

When the switch-over valve 38 is in the primary molding position shown in FIG. 5, a sprue 43 extending through the runner plate 33 is connected to the runner 35 which is connected to the primary molding cavity C, through a groove $40a$ in the first spool 40, and is disconnected from the runner 37 which is connected to the secondary molding cavity $C_2$ by a land $42b$ of the second spool 42. When the switch-over valve 38 is in the secondary molding position shown in FIG. 9, the sprue 43 is connected to the runner 37 which is connected to the secondary molding cavity C2 through the groove $42a$ in the second spool 42, and is disconnected from the runner 35 which is connected to the primary molding cavity $C_1$ by the land $40b$ of the first spool 40.

The operation of the embodiment of the present invention will be described below.

First, at the primary molding step, the movable plate 12 is moved toward the stationary plate 11 in a state in which the cylinder 16 has been contracted and the slider 15 has been stopped in the primary molding position, as shown in FIGS. 2 and 3, thereby clamping the movable core 23, the primary molding upper slide core $24_1$, the primary molding lower slide core $25_1$ and the primary molding stationary core $28_1$ of the primary molding die $D_1$. At this time, the switch-over valve 38 is in a state shown in FIG. 5, and the molten resin supplied from the sprue 43 is supplied via the groove $40a$ in the first spool 40, the runner 35, the runner 32 and the disk gate 31 to the primary molding cavity $C_1$, whereby the main section 2 of the throttle body 1 shown in FIG. 1 is formed in an injection molding manner.

The main section 2 formed at the primary molding step is generally cylindrical and has a thickness uniform in various portions, and the generation of a shrinkage and a warping during cooling is suppressed to the minimum. Therefore, the inner peripheral surface of the main section 2 requiring a dimensional accuracy can be formed in a truly circular shape with a high accuracy. In addition, the molten resin can be supplied uniformly to the entire area of the primary molding cavity $C_1$ through the disk-shaped disk gate 31. Therefore, the flow of the molten resin can be prevented from being disturbed to inhibit the orientation of a filler contained in the molten resin and further to enable a high-accuracy molding. Moreover, the pair of boss portions $2_3$, $2_3$ for supporting the stem 6 of the throttle valve 5 can be integrally formed on the main section 2 by the core pins $26_1$ and $27_1$ provided on the primary molding upper slide core $24_1$ and the primary molding lower slide core $25_1$, respectively, thereby reducing the number of treating steps.

When the primary molding step has been completed in the above manner, the movable plate 12 is moved away from the stationary plate 11, and in operative association with this movement, the primary molding upper slide core $24_1$ and the primary molding lower slide core $25_1$ guided by the inclined pins $29_1$ and $30_1$ are moved vertically away from each other, thereby opening the primary molding die $D_1$. At the next pipe setting step, the pipe 4 is temporarily supported on the plurality of locking projections $2_5$ provided on the cylindrical portion $2_1$ of the main section 2 to protrude therefrom, as shown in FIG. 1B.

Figure 7:
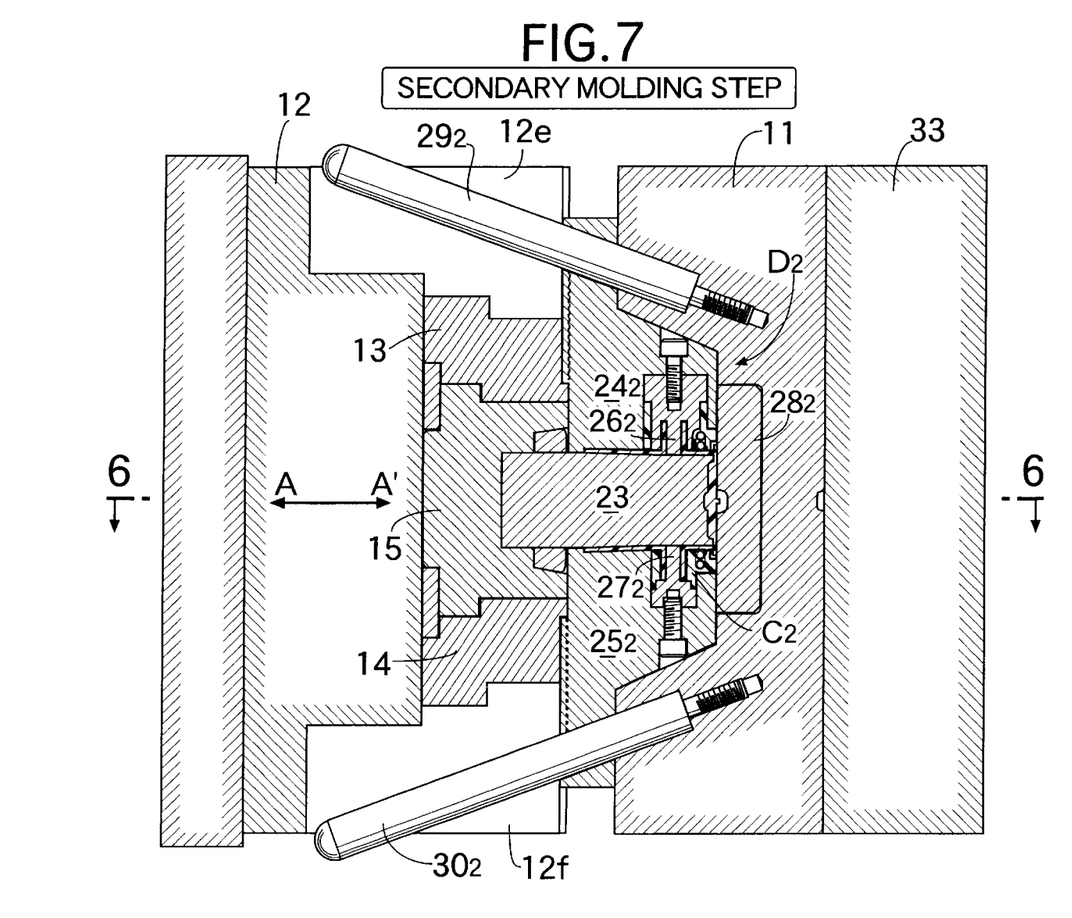
FIG. 7 is a sectional view taken along a line 7—7 in FIG. 6.
Figure 8:
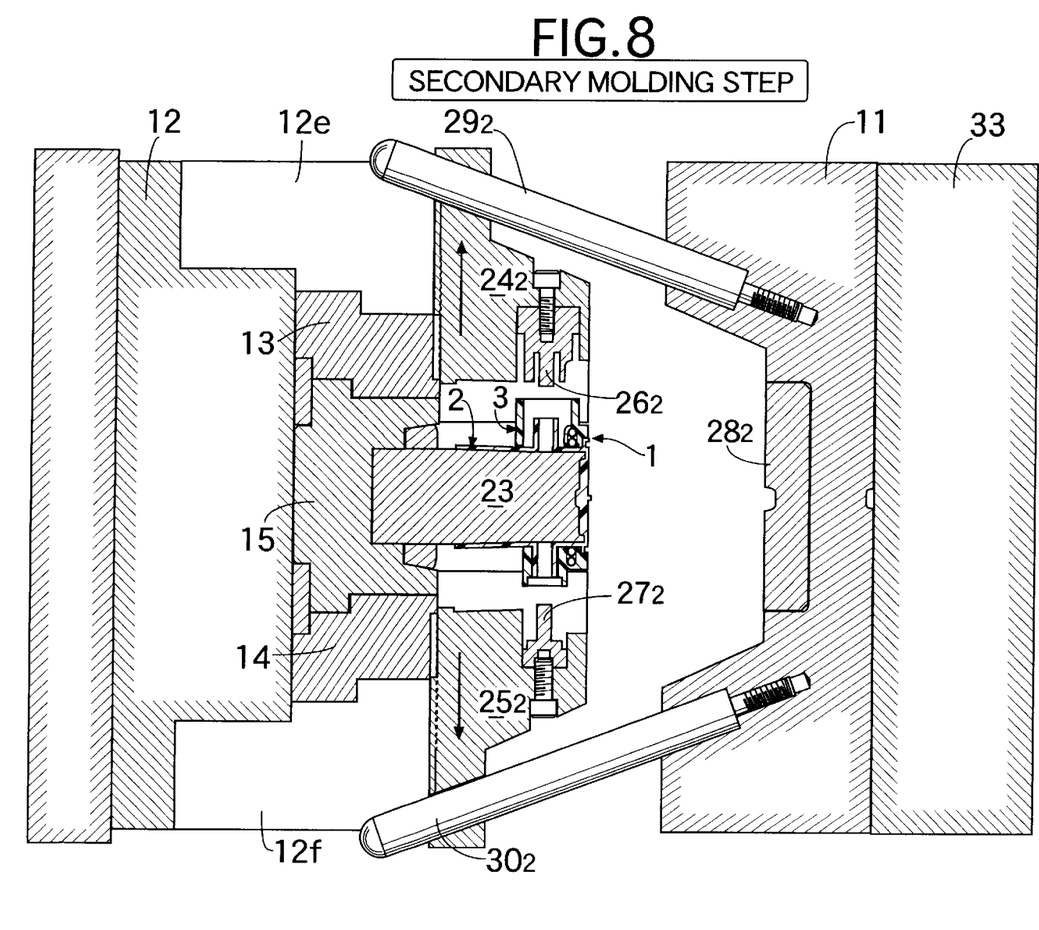
FIG. 8 is a view similar to FIG. 7, but for explaining the operation.

Then, when the cylinder 16 is expanded, causing the slider 15 integral with the movable core 23 to be moved to the secondary molding position shown in FIGS. 6 and 7, the movable core 23, the secondary molding upper slide core $24_2$, the secondary molding lower slide core $25_2$ and the secondary molding stationary core $28_2$ of the secondary molding die $D_2$ are clamped by moving the movable plate 12 again toward the stationary plate 11. During the clamping, the secondary molding upper slide core $24_2$ and the secondary molding lower slide core $25_2$ are moved toward each other, while being guided by the inclined pins $29_2$ and $30_2$.

Figure 9:
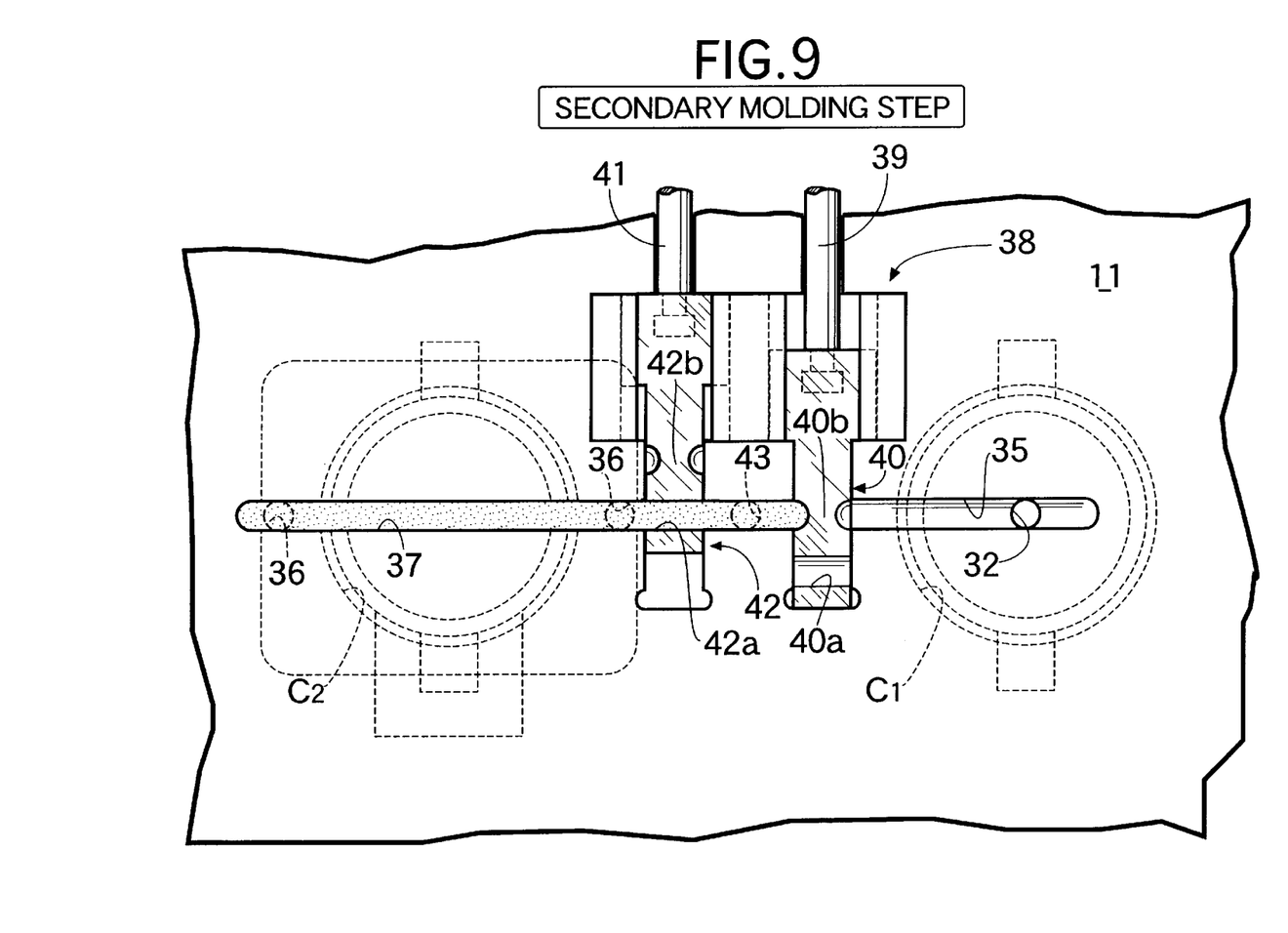
FIG. 9 is an enlarged view taken along a line 9—9 in FIG. 6.

At this time, the switch-over valve 38 is in a state shown in FIG. 9, and the molten resin supplied from the sprue 43 is supplied via the groove 42a in the second spool 42, the runner 37 and the runners 36, 36 into the secondary molding cavity $C_2$, whereby the subsidiary section 3 of the throttle body 1 shown in FIG. 1C is formed by injection molding to cover the main section 2. Then, the movable plate 12 is moved away from the stationary plate 11 to open the secondary molding die $D_2$, and the throttle body 1 which is formed by injection molding is withdrawn. Thereafter, the cylinder 16 is contracted, causing the slider 15 to be returned to the primary molding position shown in FIG. 2, thus completing the steps of one cycle.

In the present embodiment, the same type of resin materials are used in both of the primary and secondary molding steps. The main section 2 and the subsidiary section 3 of the throttle body 1 are formed from the same type of resin materials.

In this way, the main body 2 having a uniform wall thickness is first formed in a precision molding manner at the primary molding step, and the subsidiary section 3 having an non-uniform wall thickness is then formed at the secondary molding step to cover the main section 2. Therefore, the dimensional accuracy of the inner peripheral surface of the main section 2 can be remarkably enhanced, as compared with a case where the main section 2 and the subsidiary section 3 are formed in a single molding step.

In addition, since the same type of a resin material is used in the primary molding and secondary molding, the main section 2 and the subsidiary section 3 are integrally formed with a good conformation, leading to a further increased degree of circularity or roundness of the inner peripheral surface of the main section 2. Moreover, the injection molding apparatus may be arranged to be able to accommodate the injection of one type of a molten resin and hence, the structure of the injection molding apparatus can be simplified, leading to a remarkably reduced equipment cost, as compared with an injection molding apparatus arranged to accommodate the injection of two type of molten resins used for forming the primary molding and the secondary molding.

Figure 10:
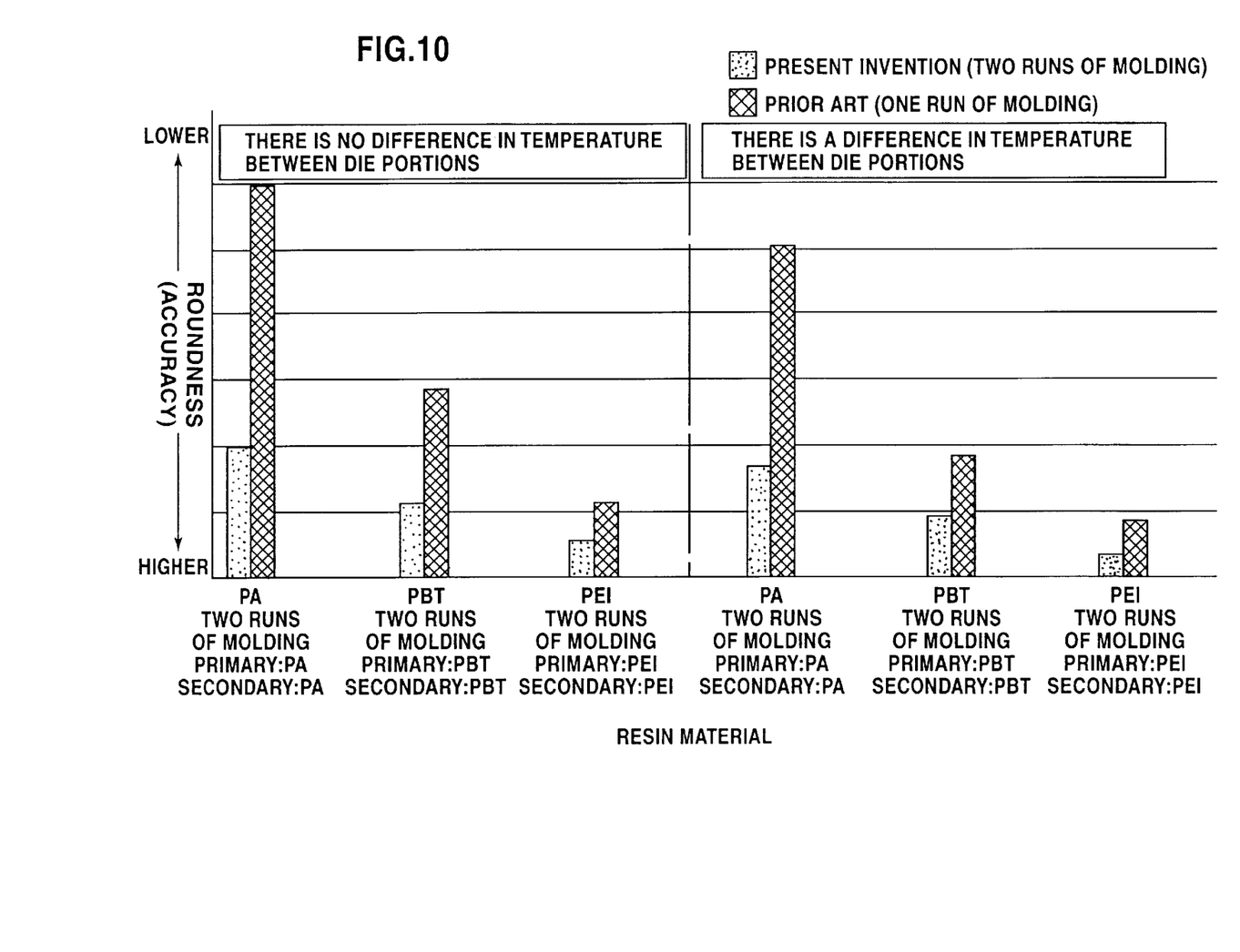
FIG. 10 is a graph showing the roundness or circularity of a main section of the throttle body.

A graph in FIG. 10 shows the measured roundness in inside diameter of the main section 2, when the throttle body 1 has been formed by the process of the present invention (i.e., the process for forming the main section 2 and the subsidiary section 3 in the primary molding and the secondary molding), and the measured roundness in inside diameter of the main section 2, when the throttle body 1 has been formed by the conventionally known process (i.e., the process for forming the main section 2 and the subsidiary section 3 at a single molding step). The roundness represents a maximum value of an error to the roundness in inside diameter of the main section 2 of the throttle body 1. As the value is smaller, the accuracy is higher, and as the value is larger, the accuracy is lower.

The roundness was measured when the throttle body 1 was formed using various materials which are a general-purpose engineering plastic and a super engineering plastic. Results are given in FIG. 10, which were provided when the throttle body 1 was formed using three of these resin materials, i.e., a polyamide (PA)-based resin, a polybutylene terephthalate (PBT)-based resin and a polyether imide (PEI)-based resin. The term "there is no difference in die temperature" indicates a case where the temperature of the entire die was maintained constant, wherein such temperature was determined depending on the type of the resin. The term "there is a difference in die temperature" indicates a case where the temperature (the internal temperature )of a portion of the die facing the inner peripheral surface of the main section 2 of the throttle body 1 was maintained lower than the temperature (the external temperature) in the other portion of the die, wherein such temperature was determined depending on the type of the resin. The temperature of the die can be controlled by the flow rate of cooling water flowing within the die.

As apparent from FIG. 10, in both of cases of "there is no difference in die temperature" and "there a difference in die temperature", the accuracy was lower when the conventional single molding step was carried out, whereas in the present embodiment, the accuracy was slightly reduced as the primary molding and the secondary molding were carried out, but the accuracy of the final secondary molded product was far increased, as compared with the product formed at the conventional single molding step. In addition, the influence exerted by the resin material is as follows: When PA which is an extremely inexpensive general-purpose engineering plastic was used, the accuracy was lower, and when PBT which is a relatively expensive general-purpose engineering plastic was used, the accuracy was considerably high. When PEI which is an expensive super engineering plastic was used, the accuracy was highest.

Further, in the case of "there is a difference in die temperature", the accuracy was increased indiscriminately, as compared with the case of "there is no difference in die temperature". The reason is that the inner peripheral surface of the main section 2 of the throttle body 1 requiring the dimensional accuracy can be cooled more early than the other portions by setting the temperature of the movable core 23 for forming the inner peripheral surface of the main section 2 of the throttle body 1 at a level lower than that of the other portions, thereby preventing the generation of a shrinkage.

If a super engineering plastic (e.g., a polyether imide (PEI), a polyether sulfone (PES), a polyphenylene sulfide (PPS), a polyamideimide (PAI) or the like) is used for forming the throttle body 1 in an injection molding manner, it is extremely effective for ensuring the accuracy, but a problem of an increased cost is arisen. On the other hand, if a general-purpose engineering plastic (e.g., a polyamide (PA), a polyacetal (POM), a polybutylene terephthalate (PBT) or the like) is used in place of the super engineering plastic, the dimensional accuracy is slightly degraded, but the cost can be reduced.

Therefore, any of the specification having a preference of the dimensional accuracy and the specification having a preference of the cost can be selected freely by using the same type of super engineering plastics are used at the primary and secondary molding steps, when the dimensional accuracy is important, and using the same type of general-purpose engineering plastics are used at the primary and secondary molding steps, when the dimensional accuracy is not so important.

Different types of resin materials may be used at the primary and secondary molding steps, respectively. More specifically, if a super engineering plastic such as a polyether imide or the like is used at the primary molding step at which a dimensional accuracy is required, and an inexpensive general-purpose engineering plastic such as a polyamide (PA) or the like is used at the secondary molding step at which a dimensional accuracy is less required, the reduction in cost can be provided.

A second embodiment of the present invention will now be described with reference to FIGS. 11A and 11B.

In the above-described first embodiment, the molten resin has been poured with a time lag into the primary molding die $D_1$ and the secondary molding die $D_2$. In the second embodiment, however, a molten resin is poured simultaneously into the primary molding die $D_1$ and the secondary molding die $D_2$, whereby the producing efficiency can be enhanced. For this purpose, the movable plate 12 can be rotated intermittently by 180° about an axis L, and two movable cores $23_1$, $23_1$ are mounted on the movable plate 12. The structure of the stationary plate 11 is substantially the same as in the first embodiment, but the switch-over valve 38 is not mounted, because the molten resin is poured simultaneously into the primary molding die $D_1$ and the secondary molding die $D_2$.

Figure 11A:
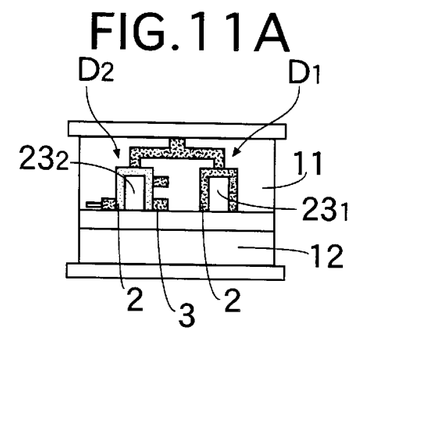
FIGS. 11A to 11E are views showing a throttle body at respective steps according to a second embodiment of the present invention.

Thus, a primary molding is carried out in the primary molding die $D_1$ and a secondary molding is carried out in the secondary molding die $D_2$ by supplying the molten resin simultaneously into both the dies $D_1$ and $D_2$ in a state in which the primary molding die $D_1$ is unoccupied, and the formed main section 2 has been set in the secondary molding die $D_2$, as shown in FIG. 11A.

Figure 11B:
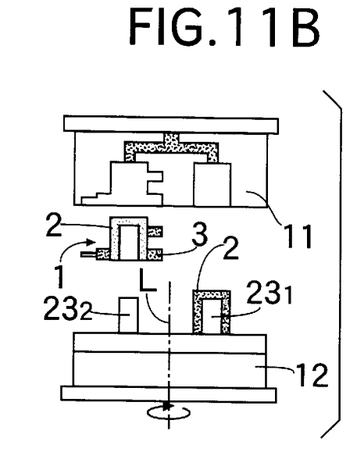
Figures 11C, 11D:
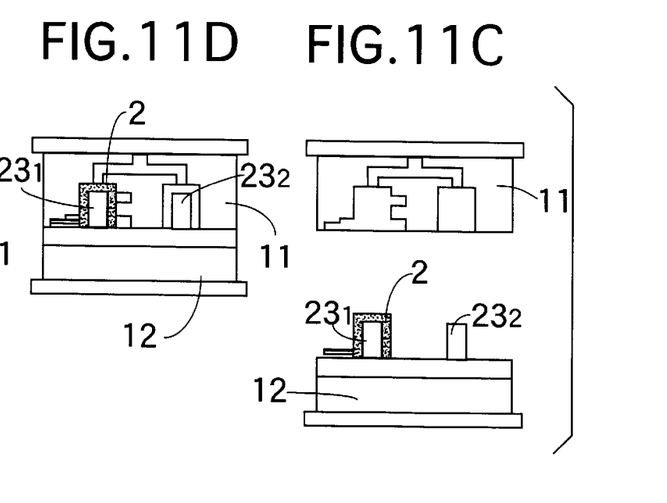
Figure 11E:
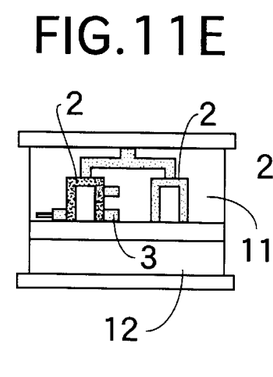

Then, the die-opening is carried out, as shown in FIG. 11B. The completed throttle body 1 is withdrawn from the secondary molding die $D_2$, and the movable core $23_1$ and the main section 2 are moved to the secondary molding die $D_2$, as shown in FIG. 11C, by rotating the movable plate 12 through 180°. The die-clamping is carried out, as shown in FIG. 11D and then, the molten resin is supplied simultaneously into both the dies $D_1$ and $D_2$, as shown in FIG. 11E, returning to the state shown in FIG. 11A.

According to the present embodiment, one throttle body 1 can be formed in one run of the injection of the molten resin, leading to a remarkably increased production efficiency.

Figure 12A:
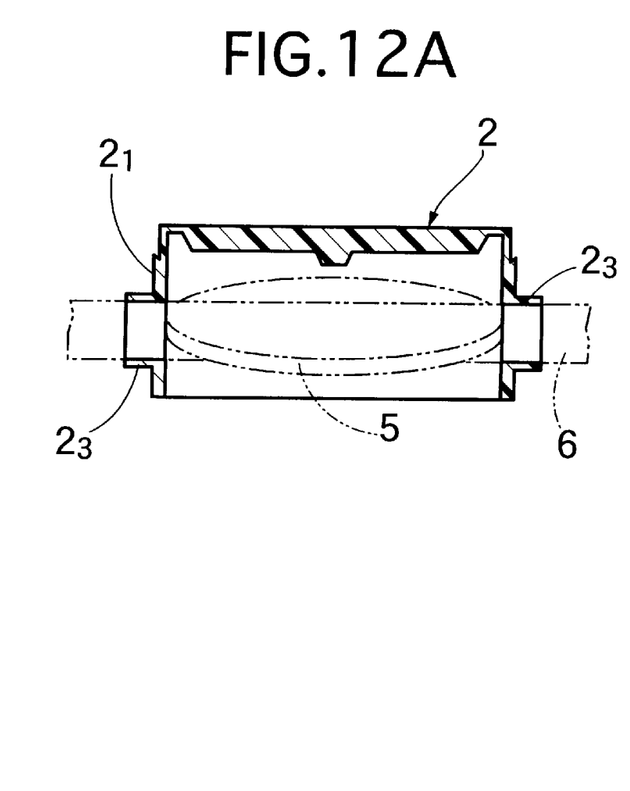
FIGS. 12A and 12B are views showing the shapes of a throttle body according to a third embodiment of the present invention.
Figure 12B:
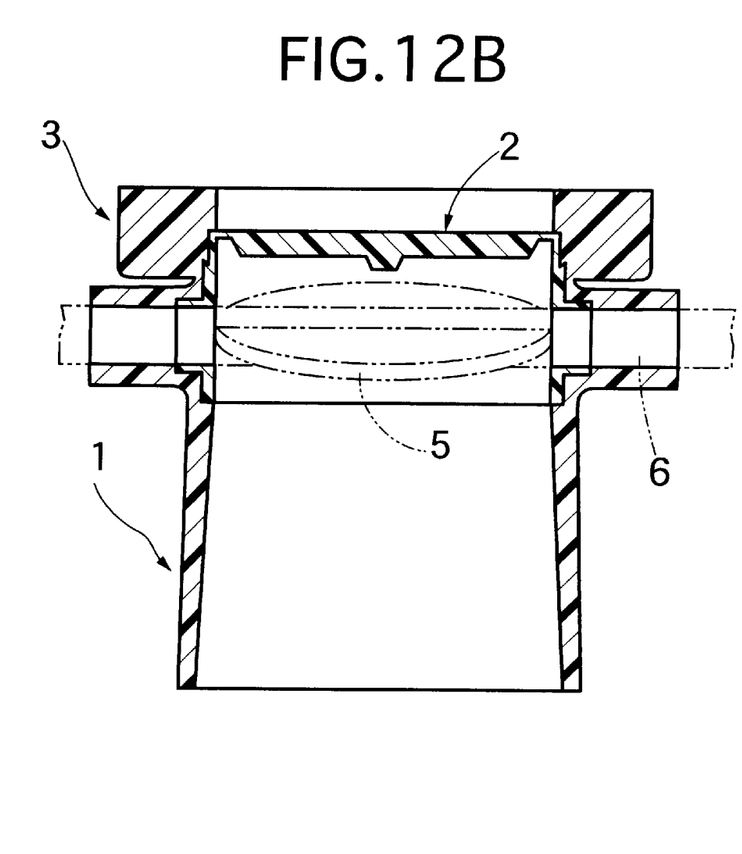

A third embodiment of the present invention will now be described with reference to FIGS. 12A and 12B.

In the third embodiment, the size of the main section 2 of the throttle body 1 is reduced as much as possible and limited in a range corresponding to the outer periphery of the throttle valve 5, and the size of the remaining subsidiary section 2 is increased. It is extremely effective for ensuring the accuracy to use a super engineering plastic (e.g., a polyether imide (PEI), a polyether sulfone (PES), a polyphenylene sulfide (PPS), a polyamideimide (PAI) or the like), particularly, a polyether imide (PEI) as a resin material, but it is a drawback that such an engineering plastic is highly expensive. Therefore, the ensuring of the dimensional accuracy and the reduction in cost can be reconciled by using a super engineering plastic, particularly, a polyether imide for the main section 2 requiring a high dimensional accuracy and reduced in size, and using a general-purpose engineering plastic (e.g., a polyamide (PA), a polyacetal (POM), a polybutylene terephthalate (PBT) or the like), particularly, an inexpensive polyamide (PA) for the remaining subsidiary section 3 which does not require the dimensional accuracy.

Although the embodiments of the present invention have been described in detail, it will be understood that the present invention is not limited to the above-described embodiments, and various modifications may be made without departing from the spirit and scope of the invention defined in claims.

For example, the primary molding die may be placed into the secondary molding die, whereby the primary and secondary molding steps may be carried out in the same die.

What is claimed is:

1. A process for producing an intake member of a resin by injection molding, in which said intake member includes a generally cylindrical main section of a resin, and a subsidiary section of a resin integrally connected to an outer periphery of said main section, said process comprising the steps of:

a primary molding step of forming said main section in a primary molding die, and a secondary molding step of subsequently inserting the formed main section into a secondary molding die to form said subsidiary section integrally with said main section in said secondary molding die wherein a die temperature at an inner peripheral surface of said main section in the primary molding die is set lower than the die temperature at an outer peripheral surface of said main section in the primary molding die at said primary molding step.

2. A process for producing an intake member of a resin by injection molding according to claim 1, wherein at said primary molding step, a molten resin is supplied through a disk gate to axially one end of a cavity of said primary molding die.

3. A process for producing an intake member of a resin by injection molding according to claim 1 or 2, wherein said intake member of resin is a throttle body having a throttle valve turnably supported therein.

4. A process for producing an intake member of a resin by injection molding according to claim 3, wherein a pair of boss portions for supporting a stem portion of said throttle valve is integrally formed on said main section at said primary molding step.

5. A process for producing an intake member of a resin by injection molding according to claim 1, wherein different types of resin materials are used for forming said main section and said subsidiary section.

6. A process for producing an intake member of a resin by injection molding according to claim 1, wherein said intake member is integrally formed by injection-molding a super engineering plastic as a resin material in a cavity of said primary molding die and injection-molding a general-purpose engineering plastic as a resin material in a cavity of said secondary molding die.

7. A process for producing an intake member of a resin by injection molding, in which said intake member includes a generally cylindrical main section, and a subsidiary section integrally connected to an outer periphery of said main section, said process comprising the steps of:

a primary molding step of forming said main section in a primary molding die, and a secondary molding step of subsequently inserting the formed main section into a secondary molding die to form said subsidiary section integrally with said main section in said secondary molding die, wherein the same type of a resin material is used for forming said main section and said subsidiary section and wherein a die temperature at an inner peripheral surface of said main section in the primary molding die is set lower than the die temperature at an outer peripheral surface of said main section in the primary molding die at said primary molding step.

8. A process for producing an intake member of a resin by injection molding according to claim 7, wherein said resin material is a super engineering plastic or a general-purpose engineering plastic.

* * * * *